March 27, 1928.
J. A. THOMPSON ET AL
1,664,334
PROCESS OF TREATING NUT KERNELS
Filed April 8, 1926
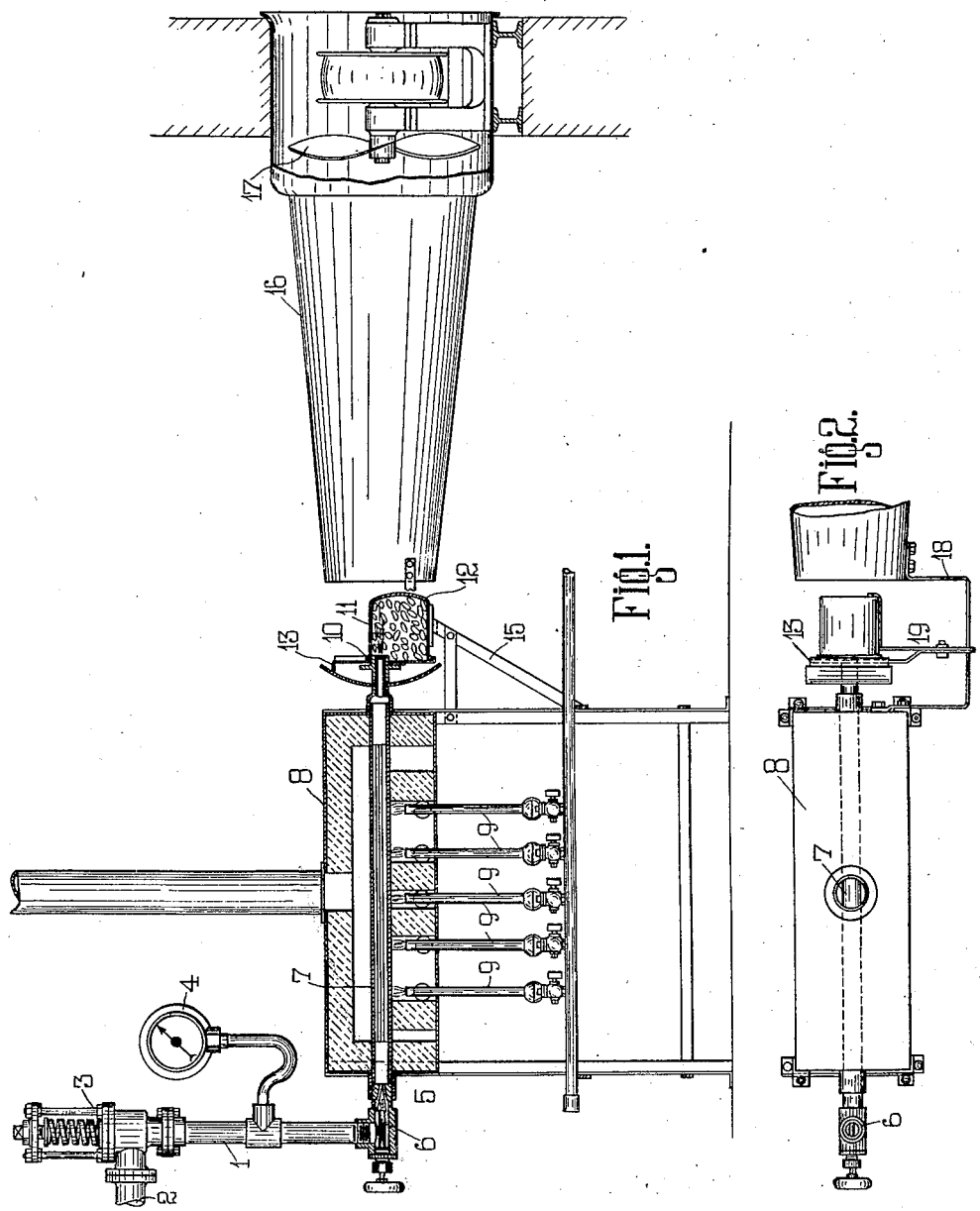

Patented Mar. 27, 1928.

1,664,334

UNITED STATES PATENT OFFICE.

JOHN ALEXANDER THOMPSON, OF HESWALL, AND WILLIAM SAMUEL HOUGH, OF HOYLAKE, ENGLAND.

PROCESS OF TREATING NUT KERNELS.

Application filed April 8, 1926, Serial No. 100,734, and in Great Britain September 18, 1925.

This application is a continuation in part of our prior application Serial No. 69,490, filed November 16th, 1925, for which it has been substituted.

This invention relates to an improved process for treating Brazil nut kernels for the purpose of blanching them by removal of the skin and to improved blanched Brazil nuts.

It is desirable to supply Brazil nut kernels without the external skin, but if it is attempted to remove the skin from Brazil nuts by treating with boiling water in the same way as is done in the treatment of almonds, it is found that the skin adheres more closely to the kernel. Therefore Brazil nut kernels are sometimes blanched by mechanical removal of the skin.

Brazil nuts so treated have the skins removed but the mechanical treatment is inconvenient and the blanched nuts are scraped or scored.

One of the objects of the present invention is to provide a process in which the nuts are blanched without mechanical removal of the skin. Another object is to provide blanched Brazil nuts which are not scored or scraped, and therefore possess what may be termed a natural surface, i. e. the normal outer surface (present immediately under the skin) is intact.

By the process of the present invention Brazil nut kernels are subjected while free to move to the action of a stream of superheated steam. The time during which the superheated steam is allowed to act must be extremely brief so that the nuts are not cooked, e. g. less than one minute and preferably about 15 seconds. In this brief exposure, however, it is necessary that every part of the skin shall come into direct contact with the stream of superheated steam. Otherwise the kernels will only be blanched where the stream of superheated steam has impinged directly upon them. It is therefore necessary that the kernels be free to move within the space in which they are treated so that they may be whirled about and brought into intimate contact all over with the superheated steam. We therefore use the expression "free to move" in the sense that the kernels occupy so small a part of the space in which they are treated that they are able to be moved about by the stream of superheated steam so as to present every part of their surface directly to said steam. The formation of "pockets" in the treating space, in which the kernels may move out of intimate and direct contact with the steam is to be avoided; it is also desirable to avoid such ordered or regular movement as would not continually present fresh portions of the surface of the kernels to the incoming steam. The invention further consists in whirling the kernels about in a confined space by the aid of a blast of superheated steam and at the same time blowing away the skin in the form of chaff.

It is believed that the process causes the pores on the surface of the kernels to be sealed thus causing the oils naturally occurring therein to be retained within the kernel. The kernels retain their natural flavour for a much longer period than kernels not so treated. The homogeneous surface so formed also assists in counteracting the effect of atmospheric moisture and conditions. Whatever may be the mechanism of the change in the surface of the nut produced by the process, it is found in practice that nuts so treated do not exude oil when gently pressed whereas nuts from which the skin has not been removed or from which it has been removed mechanically readily exude oil on slight pressure.

The temperature of the steam should be over 100° C. and preferably 200° C. although it may be varied according to the condition of the nuts. Fresh moist kernels require drier steam and therefore a higher temperature of superheating is necessary but for kernels which have been kept for a time or are otherwise of a drier nature, the steam may be at a lower temperature.

It is found that the nuts have better keeping qualities if, after blanching, they are dried gently by the aid of hot air.

A preferred mode of operation will be described with reference to the accompanying drawings in which:—

Figure 1 is an elevation of a suitable apparatus.

Figure 2 is a plan of the left hand portion of Fig. 1.

Wet steam from the boiler enters the pipe 1 at 2, passing the safety valve 3 and pressure gauge 4. It then passes through the valve 5 where its pressure is controlled by the needle 6 into the superheater 7. This consists of an invar tube packed with copper piping mounted within the furnace 8 and heated by controllable gas jets 9. The steam so superheated passes out of the nozzle 10 into the container 11.

This container 11 preferably consists of a cylindrical iron vessel open at one end and having a dished end 12. The container is enamelled on the inside and as free as possible from internal projections. A vessel with a seam, for example, is much less suitable than a seamless one. The container is provided with a sliding lid 13 provided with an aperture 14 through which the nozzle 10 projects the superheated steam.

The container 11 is half filled with the Brazil nut kernels, the lid 14 placed in position, and mounted on the stand 15. It is held there for 10 to 15 seconds while the steam is passing through the jet 10. It will be noticed that the jet 10 is unsymmetrically placed with respect to the container 11 and this causes the nuts to be whirled about inside the container so that all are brought into intimate contact with the steam on all sides. The steam escapes from under the sides of the lid and through apertures in the lid provided for the purpose carrying with it most of the skin in the form of chaff. This is drawn away by means of a current of air drawn up the funnel 16 by the fan 17. A stay 18 secured to the funnel and to the end of the furnace supports the handle 19 of the container 11.

We declare that what we claim is:—

1. Process of blanching Brazil nut kernels which consists in subjecting them while free to move to the agitating and treating action of a stream of superheated steam.

2. Process of blanching Brazil nut kernels which consists in causing them to be whirled about for less than a minute in a confined space by means of a blast of superheated steam.

3. Process of blanching Brazil nut kernels which consists in subjecting them for less than a minute while freely moving to the agitating and treating action of superheated steam.

4. Process of blanching Brazil nut kernels which consists in subjecting them for about 15 seconds while freely moving to the agitating and treating action of steam superheated to about 200° C.

5. Process of blanching Brazil nut kernels which consists in whirling them about in a confined space and blowing away the skin by means of a blast of superheated steam acting for a time insufficient to cook the kernels.

6. Process of blanching Brazil nut kernels which consists in whirling them about for about 15 seconds in a confined space by means of a blast of superheated steam.

7. Process of blanching Brazil nut kernels which consists in whirling them about in a confined space and blowing away the skin by means of a blast of superheated steam acting for about 15 seconds.

8. Process of treating Brazil nut kernels which comprises agitating the kernels by superheated steam in a space which is only partially filled with kernels so that they move about freely and then drying the thus blanched kernels.

In witness whereof, we have hereunto signed our names this 26th day of March, 1926.

JOHN A. THOMPSON.
WILLIAM S. HOUGH.